United States Patent
Davies et al.

(10) Patent No.: US 10,798,352 B2
(45) Date of Patent: Oct. 6, 2020

(54) RENDERING WIDE COLOR GAMUT TWO-DIMENSIONAL (2D) IMAGES ON THREE-DIMENSIONAL (3D) CAPABLE DISPLAYS

(71) Applicant: Dolby Laboratories Licensing Corporation, San Francisco, CA (US)

(72) Inventors: Trevor Davies, Walnut Creek, CA (US); Martin Richards, Gig Harbor, WA (US); Ashley Penna, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/312,256

(22) PCT Filed: Jun. 22, 2017

(86) PCT No.: PCT/US2017/038829
§ 371 (c)(1),
(2) Date: Dec. 20, 2018

(87) PCT Pub. No.: WO2017/223355
PCT Pub. Date: Dec. 28, 2017

(65) Prior Publication Data
US 2019/0238809 A1      Aug. 1, 2019

Related U.S. Application Data

(60) Provisional application No. 62/353,325, filed on Jun. 22, 2016, provisional application No. 62/402,296, filed on Sep. 30, 2016.

(51) Int. Cl.
*H04N 9/31*    (2006.01)
*G09G 3/34*    (2006.01)
*G09G 5/02*    (2006.01)

(52) U.S. Cl.
CPC ........ *H04N 9/3182* (2013.01); *G09G 3/3413* (2013.01); *G09G 5/02* (2013.01);
(Continued)

(58) Field of Classification Search
CPC .................................................. H04N 9/3182
(Continued)

(56) References Cited

U.S. PATENT DOCUMENTS 7,403,205 B2    7/2008   Zeng
8,098,400 B2    1/2012   Tin
(Continued)

FOREIGN PATENT DOCUMENTS

CN    103048782    4/2013
CN    103430555    12/2013
(Continued)

OTHER PUBLICATIONS

Kauvar et al., "Adaptive Color Display via Perceptually-driven Factored Spectral Projection", ACM Trans. Graph. 34, 6 (Oct. 2015) (Year: 2015).*
(Continued)

*Primary Examiner* — Phong X Nguyen (57) ABSTRACT

A display for displaying image data includes defining virtual color gamuts based on a plurality of primary display colors associated with a light source. At least one of the virtual color gamuts is defined to approximate an established color gamut. Intensity values associated with the virtual color gamuts are generated based on received video data, and the intensity values associated with the virtual color gamuts are used to generate drive values for the primary colors of the light source. A display using one or more virtual color gamuts is also disclosed.

14 Claims, 7 Drawing Sheets

(52) U.S. Cl.
CPC ... *H04N 9/3161* (2013.01); *G09G 2320/0666* (2013.01); *G09G 2340/06* (2013.01)

(58) Field of Classification Search
USPC ........................................................ 345/590
See application file for complete search history.

(56) References Cited

U.S. PATENT DOCUMENTS

| | | | |
|---|---|---|---|
| 8,177,367 B2 | 5/2012 | Ellinger | |
| 8,390,643 B2 | 3/2013 | Belik | |
| 8,477,366 B2* | 7/2013 | Bang | G06T 11/001 345/590 |
| 8,599,226 B2 | 12/2013 | Ben-Chorin | |
| 8,610,762 B2 | 12/2013 | Sharp | |
| 9,147,362 B2 | 9/2015 | Znamenskiy | |
| 9,230,494 B2* | 1/2016 | Hasegawa | G09G 3/3607 |
| 9,245,471 B2* | 1/2016 | Tomizawa | G09G 3/3611 |
| 9,264,681 B2* | 2/2016 | Gish | G09G 5/02 |
| 9,324,250 B2 | 4/2016 | Basler | |
| 9,997,133 B2* | 6/2018 | Kim | H04N 9/643 |
| 2005/0031199 A1* | 2/2005 | Ben-Chorin | G09G 5/02 382/162 |
| 2006/0285217 A1* | 12/2006 | Roth | G02B 27/145 359/634 |
| 2007/0070363 A1 | 3/2007 | Zeng | |
| 2007/0103646 A1* | 5/2007 | Young | G03B 21/2033 353/52 |
| 2007/0247402 A1 | 10/2007 | Delacour | |
| 2009/0278862 A1* | 11/2009 | Shimodaira | G09G 3/2003 345/690 |
| 2010/0091050 A1* | 4/2010 | El-Ghoroury | H04N 9/3155 345/691 |
| 2010/0315596 A1* | 12/2010 | Yoon | H04N 9/3167 353/20 |
| 2011/0157212 A1* | 6/2011 | Zhang | H04N 9/69 345/590 |
| 2012/0127194 A1 | 5/2012 | Richards | |
| 2012/0162239 A1* | 6/2012 | Marcu | G09G 5/06 345/589 |
| 2013/0033491 A1 | 2/2013 | Atkins | |
| 2013/0063573 A1* | 3/2013 | Erinjippurath | G09G 3/003 348/51 |
| 2013/0222414 A1 | 8/2013 | Ito | |
| 2014/0043371 A1 | 2/2014 | Langendijk | |
| 2014/0210802 A1* | 7/2014 | Myers | G09G 5/06 345/207 |
| 2014/0292834 A1 | 10/2014 | Ando | |
| 2014/0333660 A1 | 11/2014 | Ballestad | |
| 2015/0213626 A1* | 7/2015 | Hekstra | H04N 1/6058 345/590 |

FOREIGN PATENT DOCUMENTS

| | | |
|---|---|---|
| JP | 2014514598 | 6/2014 |
| WO | 2012/140551 | 10/2012 |

OTHER PUBLICATIONS

Kauvar, I. "Adaptive color display via perceptually-driven factored spectral projection", Nov. 15, Located Via Google Scholar, Journal ACM Transactions on Graphics (TOG)—Proceedings of ACM SIGGRAPH Asia 2015 TOG Homepage, vol. 34, Issue 6, Oct. 26, 2015, pp. 1-10.

Huang, J., "Six-color solid state illuminator for cinema projector", Located via Engineering Village, Aug. 18, 2014 to Aug. 20, 2014, Proceedings of SPIE—The International Society for Optical Engineering, v 9192, 2014; ISSN: 0277786X, E-ISSN: 1996756X; ISBN-13: 9781628412192; DOI: 10.1117/12.2060060; Article No. 91920W; Conference: Current Developments in Lens Design and Optical Engineering XV, Aug. 18, 2014 to Aug. 20, 2014; Sponsor: The Society of Photo-Optical Instrumentation Engineers (SPIE); Publisher: SPIE.

Hirai, K., "Multi-primary image projector using programmable spectral light source", 2016, Located via Engineering Village, Journal of the Society for Information Display, Feb. 2016.

Roth, S. et al., "0.2:Wide Gamut, High Brightness Multiple Primaries Single Panel Projection Displays", SID Symposium Digest of Technical Papers 34, May 1, 2003, pp. 118-121.

Frolich, J. et al., "The SMPTE Meeting Presentation Gamut Mapping for Digital Cinema Written for presentation at the", Oct. 31, 2013, XP055406263, Retrieved from the internet: URL:http://ieeexplore.ieee.org/e1x7/7269393/7269394/07269395.pdf {retrieved on Sep. 13, 2017}, p. 3 to p. 5.

* cited by examiner

RENDERING WIDE COLOR GAMUT TWO-DIMENSIONAL (2D) IMAGES ON THREE-DIMENSIONAL (3D) CAPABLE DISPLAYS

BACKGROUND

Technical Field

This invention relates generally to devices and displays for displaying image data, and more particularly to the display of 2D images on 3D capable displays.

Description of the Background Art

Displays exist that are capable of displaying three-dimensional (3D) images. For example, such displays display a left eye image and a right eye image, which, when viewed together, give the appearance of a 3D image. The left eye image can be produced using 3 primary-color light sources (e.g., red1, green1, and blue1), and the right eye image can be produced using 3 different primary-color light sources (e.g., red2, green2, and blue2), each having a slightly different wavelength than their counterpart of similar color. The viewer views the displayed images through eyewear that includes a left lens and a different right lens. The left lens passes the left eye image and blocks the right eye image, and the right lens passes the right eye image and blocks the left eye image.

Conventional two-dimensional images can be displayed by 3D displays, by driving each pair of primary light sources with the same data. For example, the 2D red data values are used to drive both the red1 and the red2 primaries. Similarly, the 2D green data values are used to drive both the green1 and the green2 primaries, and the 2D blue data values are used to drive both the blue1 and blue2 primaries. The system is calibrated with the effective combined primaries and accurate images can be produced. However, the resulting color gamut can be limited significantly with respect to a desired color gamut (e.g., the established Rec 2020 gamut).

SUMMARY

The present invention overcomes the problems associated with the prior art by providing an improved means for displaying two-dimensional (2D) video data on a three-dimension (3D) display.

An example method for displaying image data includes identifying an established color gamut defined by a pre-defined number of primary colors and identifying a number of primary display colors associated with a light source, wherein the number of primary display colors associated with the light source exceeds the number of primary colors defining the established color gamut. The example method further includes defining a first virtual color gamut based on a combination of the primary display colors associated with the light source to approximate the established color gamut. Video data is received, which includes intensity values corresponding to a number of colors (e.g., 3) fewer than the number of primary colors associated with the light source (e.g., 6). The example method further includes generating intensity values associated with the first virtual color gamut based on the video data, and generating intensity values associated with the primary display colors of the light source based on the generated intensity values associated with the first virtual color gamut. The intensity values associated with the primary display colors are then provided to a spatial light modulator.

A particular example method further includes defining a second virtual color gamut, generating intensity values associated with the second virtual color gamut based on the video data, and using the intensity values associated with the second virtual color gamut in the step of generating the intensity values associated with the primary display colors. The second virtual color gamut is defined based on residual power of the light source after defining the first virtual color gamut. In a particular example method, the video data has a format associated with the established color gamut.

In a particular example method, the number of primary display colors is twice as large as the number of colors corresponding to the intensity values of the video data. In a more particular example method, the number of primary display colors is 6 and the video data includes intensity values corresponding to no more than 3 colors.

In an example method, at least one of the steps of generating intensity values associated with the first virtual color gamut based on the video data and generating intensity values associated with the second virtual color gamut based on the video data includes determining an intensity level indicated by the video data (e.g., a separate intensity level for each color associated with the video data) and generating the intensity values associated with at least one of the first virtual color gamut and the second virtual color gamut based on the intensity level indicated by the video data. The method additionally includes determining whether the intensity level indicated by the video data exceeds a predetermined intensity level (e.g., a separate predetermined intensity level for each color associated with the video data). If the intensity level indicated by the video data does not exceed the predetermined intensity level, then the intensity values associated with the first virtual gamut are generated based on the video data and the intensity values associated with the second virtual gamut are set to zero. On the other hand, if the intensity level indicated by the video data does exceed the predetermined intensity level, then an intensity value associated with the first virtual gamut is generated based on the predetermined intensity level, and intensity value associated with the second virtual gamut is generated based on an amount that the intensity level indicated by the video data exceeds the predetermined intensity level.

In one example method, the second virtual gamut is scaled to fit intensity values of the video data within an achievable gamut volume of the light source. The scaling is achieved, for example, by compressing the second virtual gamut toward white.

Another method includes clipping intensity values of at least one of the first virtual gamut and the second virtual gamut to fit within the achievable gamut volume of the light source. Optionally, the intensity values of at least one of the first virtual gamut and the second virtual gamut are clipped toward white. As another option, the intensity values of at least one of the first virtual gamut and the second virtual gamut are clipped to the edge of the achievable gamut volume in the direction of the negative primary.

Another example method includes modeling an achievable gamut volume of the first virtual gamut and the second virtual gamut and determining whether the generated intensity values of the first virtual gamut and the second virtual gamut fit within the modeled gamut volume. Intensity values of the first virtual gamut and the second virtual gamut that fit within the modeled gamut volume are left unmodified. Intensity values of the first virtual gamut and the second virtual gamut that do not fit within the modeled gamut volume are modified to fit within the modeled gamut volume. One example method of modifying the intensity values of the first virtual gamut and the second virtual gamut includes preserving the color balance (chromaticity) of the modified intensity values and reducing the intensity (e.g., magnitude) of the modified intensity values to fit within the achievable gamut volume. Another example method of modifying the intensity values of the first virtual gamut and the second virtual gamut includes preserving the intensity (e.g., magnitude) of the modified intensity values and adjusting the chromaticity of the modified intensity values towards a white point to fit within the achievable gamut volume. Yet another example method of modifying the intensity values of the first virtual gamut and the second virtual gamut includes reducing the intensity (e.g., magnitude) of the modified intensity values and adjusting the chromaticity of the modified intensity values towards a white point, whereby the intensity values are adjusted toward a surface of the achievable gamut volume.

An example display includes a light source, a spatial light modulator, and a controller. The light source includes a number of primary display colors (e.g., 6), which exceeds a number of primary colors (e.g., 3) defining an established color gamut. The spatial light modulator is illuminated by the light source. The controller is operative to receive video data including intensity values associated with a number of colors less than the number of primary display colors. The controller can be configured to receive video data having a format associated with the established color gamut. The controller generates intensity values associated with a first virtual color gamut based on the video data. The first virtual color gamut is defined by a combination of the primary display colors to match the established color gamut. The controller also generates intensity values for each of the primary display colors based on the intensity values associated with the first virtual gamut, and provides the intensity values for each of the primary display colors to the spatial light modulator.

In an example display, the controller is further operative to generate intensity values associated with a second virtual color gamut based on the video data. The second virtual color gamut is defined based on residual power of the light source considering the first virtual color gamut. The controller is further operative to generate intensity values associated with the second virtual color gamut based on the video data, and use the intensity values associated with the second virtual color gamut to generate the intensity values associated with the primary display colors.

In a particular embodiment, the number of primary display colors is twice as large as the number of colors corresponding to the intensity values of the video data. In a more particular embodiment, the number of primary display colors is 6 and the video intensity values correspond to no more than 3 colors.

In an example display, the controller is further operative to determine an intensity level indicated by the video data, and generate the intensity values associated with at least one of the first virtual color gamut and the second virtual color gamut based on the intensity level indicated by the video data. In one embodiment, the controller determines whether the intensity level indicated by the video data exceeds a predetermined intensity level. If the intensity level indicated by the video data does not exceed the predetermined intensity level, then the controller generates the intensity values associated with the first virtual gamut based on the video data and sets the intensity values associated with the second virtual gamut to zero. If the intensity level indicated by the video data does exceed the predetermined intensity level, then the controller generates an intensity value associated with the first virtual gamut based on the predetermined intensity level, and generates an intensity value associated with the second virtual gamut based on an amount by which the intensity level indicated by the video data exceeds the predetermined intensity level.

Optionally, the controller is operative to scale the second virtual gamut to fit intensity values of the video data within an achievable gamut volume of the light source. The scaling can include compressing the second virtual gamut toward white. As another option, the controller is operative to clip intensity values of at least one of the first virtual gamut and the second virtual gamut to fit within the achievable gamut volume of the light source. The intensity values of at least one of the first virtual gamut and the second virtual gamut can be clipped toward white, or the intensity values of at least one of the first virtual gamut and the second virtual gamut can be clipped to the edge of the achievable gamut volume.

Another example display includes a modeler, a comparator, and a modifier. The modeler is operative to model an achievable gamut volume of the first virtual gamut and the second virtual gamut, in view of the light source capabilities. The comparator determines whether the generated intensity values of the first virtual gamut and the second virtual gamut fit within the modeled gamut volume. The modifier leaves the intensity values of the first virtual gamut and the second virtual gamut that fit within the modeled gamut volume unmodified, but modifies intensity values of the first virtual gamut and the second virtual gamut that do not fit within the modeled gamut volume, so that the modified values will fit within the modeled gamut volume. In a particular example display, the modifier is operative to preserve the color balance of the modified intensity values and reduce the intensity (e.g., magnitude) of the intensity values to fit within the achievable gamut volume. In another particular example display, the modifier is operative to preserve the intensity (e.g., magnitude) of the modified intensity values and adjust the chromaticity of the modified intensity values towards a white point to fit within the achievable gamut volume. In yet another particular example display, the modifier is operative to reduce the intensity (e.g., magnitude) of the modified intensity values and adjust chromaticity of the modified intensity values towards a white point, whereby the intensity values are adjusted toward a surface of the achievable gamut volume.

Any of the methods disclosed herein can be implemented with a non-transitory, electronically-readable medium having code embodied therein for causing a display device to perform the methods.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a display system and display for displaying video data defining a first number of primary colors using an illumination source defining a second, greater number of primary light source colors. In the following description, numerous specific details are set forth (e.g., projector environment) in order to provide a thorough understanding of the invention. Those skilled in the art will recognize, however, that the invention may be practiced apart from these specific details. In other instances, details of well-known video processing practices and components have been omitted, so as not to unnecessarily obscure the present invention.

Figure 1:
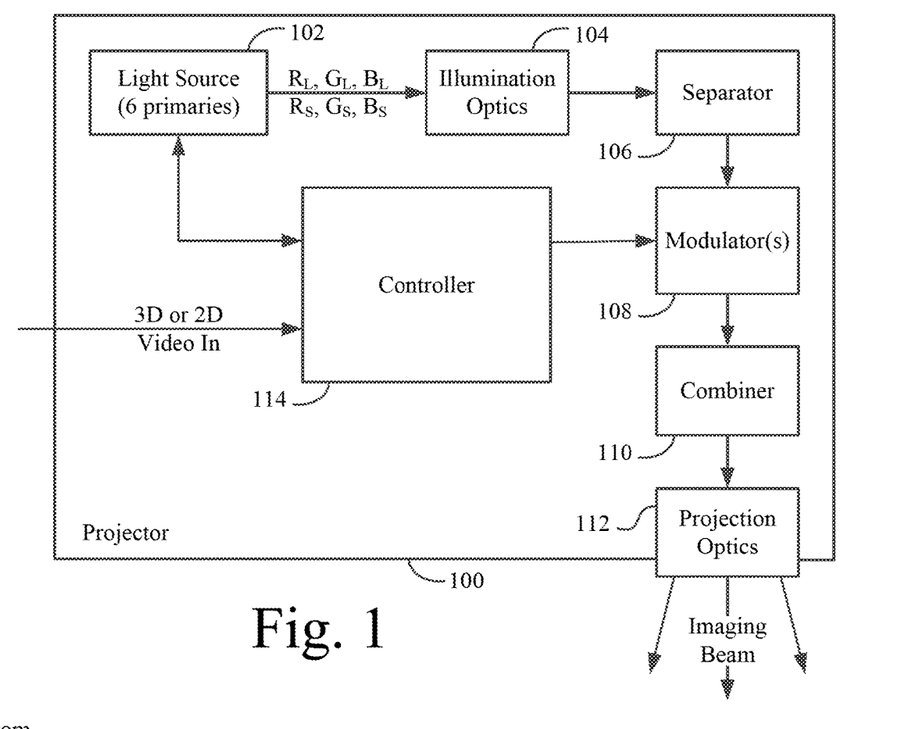
FIG. 1 is a block diagram of an example 3D display system.

FIG. 1 is a block diagram of an example 3D display system 100 capable of displaying 2D video data with an improved color gamut. In this example embodiment, display system 100 is a projector including a light source 102 with 6 primary colors (e.g., laser light sources), illumination optics 104, a separator 106, one or more modulators 108, a combiner 110, projection optics 112, and a controller 114. Light source 102 produces an illumination beam including the six primary colors and directs the illumination beam through illumination optics 104 and into color separator 106. Color separator 106 separates the multicolored beam into the 6 primary beams and directs each primary beam to an associated one of spatial light modulators 108. After the primary illumination beams are modulated, projection optics 112 focuses the modulated beam to form an imaging beam, which is projected onto a viewing surface (not shown).

In this example embodiment, there is an individual modulator for each primary color. However, the number of modulators can be reduced using a field sequential modulation scheme. In another example embodiment, the light sources, the modulators, and other components of the projector can be separated into two separate, but coordinated projectors. In yet another embodiment, the modulators can include a plurality of modulators for each primary color, as, for example, in a dual modulation projector.

Figure 2:
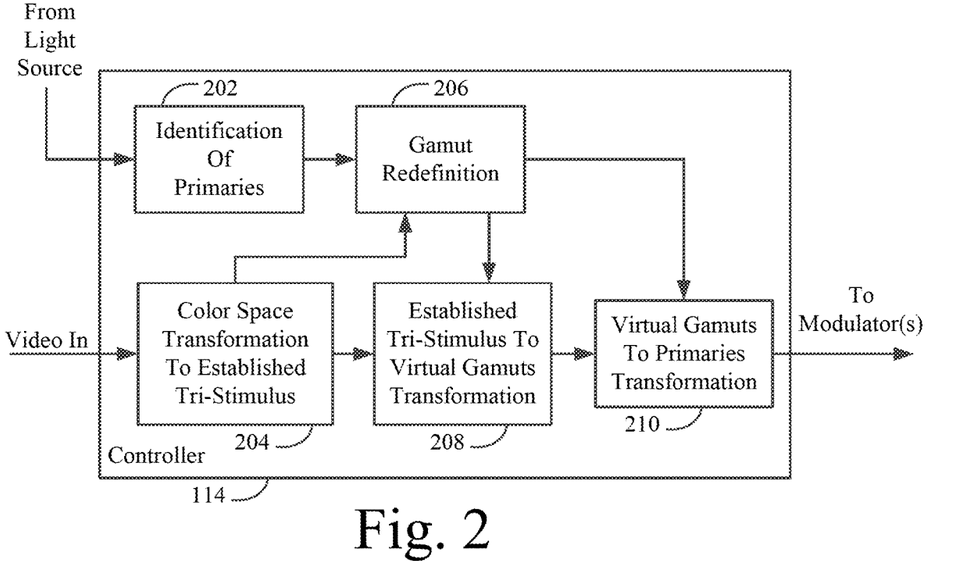
FIG. 2 is a block diagram of the controller of the 3D display system of FIG. 1.

FIG. 2 is a block diagram of an example controller 114 of the 3D display system of FIG. 1. Controller 114 includes an Identification of Primaries Module for receiving and/or storing information (e.g., calibration data) about the primary colors of light source 102. A Color Space Transformation module 204 transforms incoming 2D video data into an established tri-stimulus color space (e.g., Rec2020), if necessary. A Gamut Redefinition module 206 defines one or more virtual gamuts based on the target established color gamut and the primaries of light source 102. An Established Tri-Stimulus To Virtual Gamut Transformation module 208 converts video data into intensity values associated with the virtual gamut(s). Then, a Virtual Gamuts To Primaries Transformation module 210 converts the intensity values of the virtual gamut(s) into intensity values corresponding to the primaries of the light source and provides the resulting intensity values to the modulators.

Figure 3:
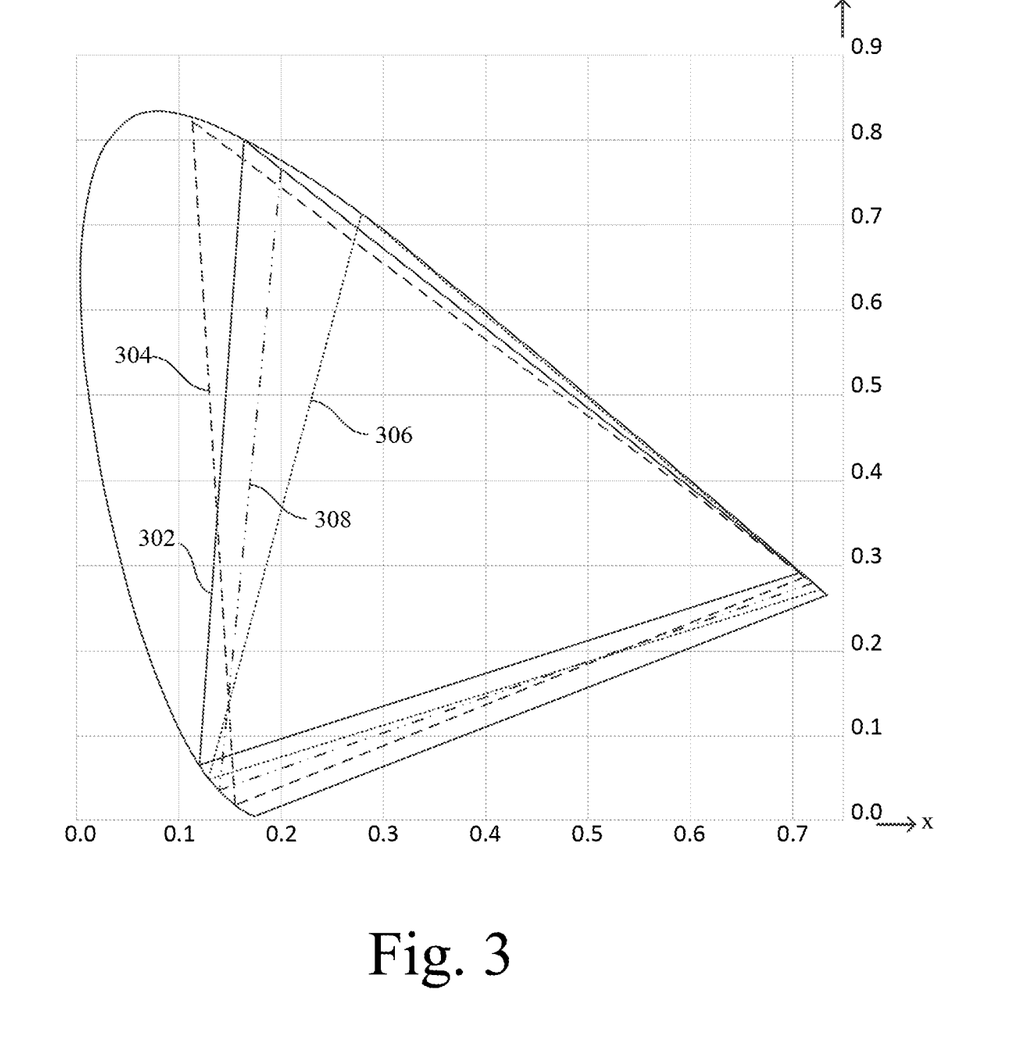
FIG. 3 is a chromaticity chart showing color gamuts associated with multiple display primary light sources.

FIG. 3 is a CIE 1931 chromaticity chart showing color gamuts associated with the multiple display primary light sources and the target established color gamut (Rec2020). Gamut 302 is the Rec2020 gamut. Gamut 304 is the gamut defined by the first 3 light source primaries ($R_L$, $G_L$, and $B_L$), which provide illumination for a right eye image when the projector is operating in 3D mode. Gamut 306 is the gamut defined by the second 3 light source primaries ($R_S$, $G_S$, and $B_S$), which provide illumination for a left eye image when the projector is operating in 3D mode. Gamut 308 is the gamut defined by driving the left eye primaries and the right eye primaries with the same values. As shown, gamut 308 significantly differs from Rec2020 gamut 302.

Figure 4:
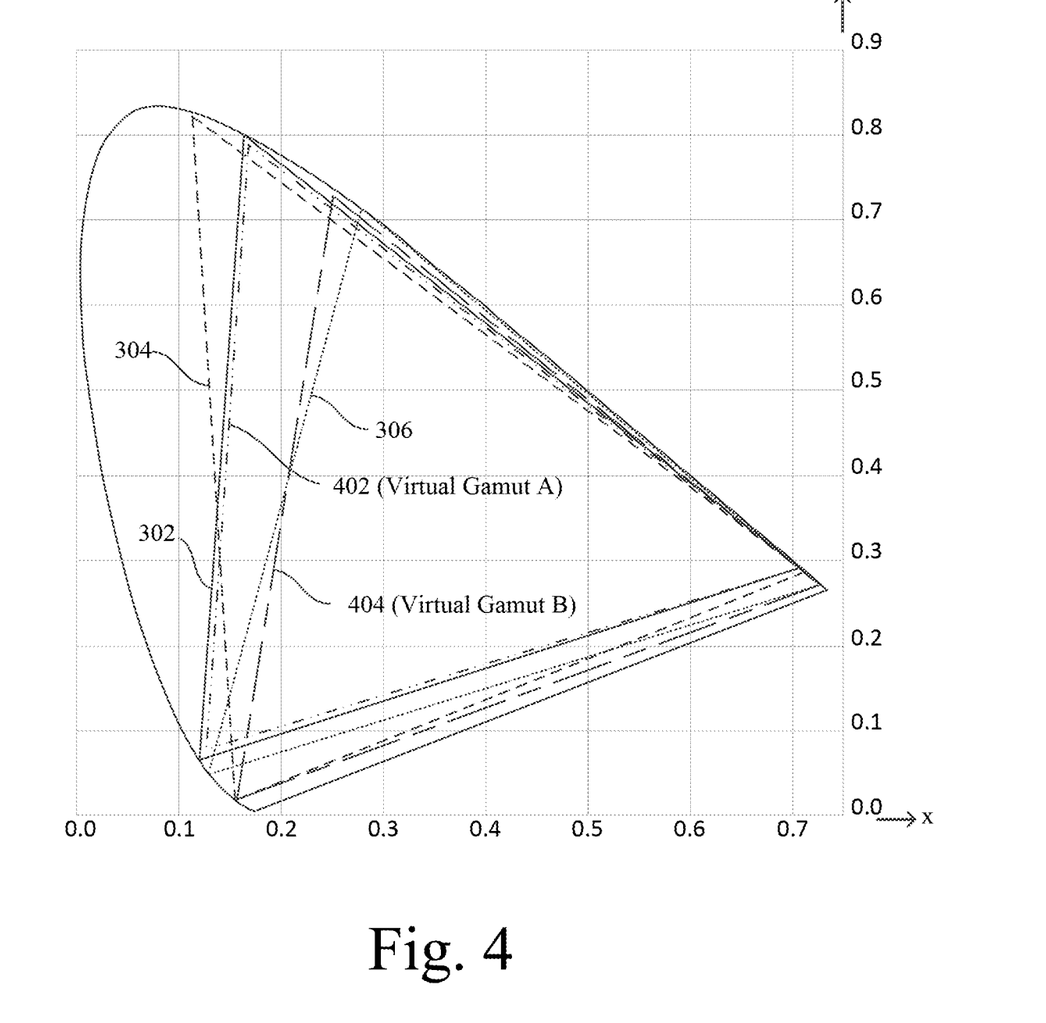
FIG. 4 is a chromaticity chart showing virtual color gamuts associated with multiple display primary light sources.

FIG. 4 is a chromaticity chart showing virtual color gamuts generated from the multiple display primary light sources. Gamuts 302, 306, and 304 of FIG. 3 are also shown for comparison. Virtual gamut 402 (Gamut A), is defined as a combination of the 6 primary light sources to closely approximate Rec2020 gamut 302. Virtual gamut 404 (Gamut B) is defined by the residual power of the 6 primary light sources. In other words, Gamut B is defined by the left over light output of the 6 primaries after the light required for Gamut A has been subtracted. As shown, virtual gamut 402 (Gamut A) matches the Rec2020 gamut 302 much more closely than the simple summation gamut 308 (FIG. 3).

The disclosed system optimizes the gamut volume for 2D images by driving the left and right eye signals differently (even though the content is only 2D and no glasses are worn). The gamut volume is divided into the two virtual gamuts: Gamut A and Gamut B. Each gamut uses virtual primaries that are specific blends of the original 6P primaries. The 'A' gamut is optimized to be as close to possible as Rec2020. The 'B' gamut uses the residual energy from the 6 primaries. The 'A' and 'B' gamuts are show in FIG. 4. Note that the 'A' gamut is very close to Rec2020.

Values in the 'A' and 'B' gamuts can be converted to the 6P primaries ($R_L$, $G_L$, $B_L$, $R_S$, $G_S$, $B_S$) using "blend" matrices as follows:

$$\begin{bmatrix} R_L \\ G_L \\ B_L \end{bmatrix} = [B_{AL}] \begin{bmatrix} R_A \\ G_A \\ B_A \end{bmatrix} + [B_{BL}] \begin{bmatrix} R_B \\ G_B \\ B_B \end{bmatrix}$$

and $$\begin{bmatrix} R_S \\ G_S \\ B_S \end{bmatrix} = [B_{AS}] \begin{bmatrix} R_A \\ G_A \\ B_A \end{bmatrix} + [B_{BS}] \begin{bmatrix} R_B \\ G_B \\ B_B \end{bmatrix}$$

Typical values for the blend matrices $[B_{AL}]$, $[B_{AS}]$, $[B_{BL}]$, and $[B_{BS}]$ are:

```
float B_AL[3][3]=
{
    { 0.0000f, 0.0000f, 0.0000f },
    { 0.0000f, 0.2859f, 0.0000f },
    { 0.0000f, 0.0000f, 0.9578f }
};
float B_AS[3][3] =
{
    { 0.9903f, 0.0000f, 0.0000f },
    { 0.0097f, 0.7141f, 0.0422f },
    { 0.0000f, 0.0000f, 0.0000f }
};
```

```
float B_BL[3][3] =
{
    { 1.0000f, 0.0000f, 0.0000f },
    { 0.0000f, 0.7141f, 0.0000f },
    { 0.0000f, 0.0000f, 0.0422f }
};
float B_BS[3][3] =
{
    { 0.0097f, 0.0000f, 0.0000f },
    { 0.0000f, 0.2340f, 0.0000f },
    { 0.0000f, 0.0000f, 1.0000f }
};
```

The 'A' gamut is used for lower luminance levels and the 'B' gamut is added, where necessary, to achieve higher luminance levels. The 'A' gamut services approximately 50% of the luminance range, above which the less-favorable 'B' gamut is added. 50% of the linear luminance range represents all but the last stop of the perceptual range and, therefore, most of perceptual range can be handled with the 'A' gamut. Above that range the 'B' gamut is added and the gamut volume tapers towards the top. Hence, the vast majority of the perceptual range can be achieved with approximately Rec2020 gamut, and yet the full luminance range can still be achieved.

Although the 'B' gamut can represent chromaticities that are outside the 'A' gamut, it would be counter-intuitive for a colorist to utilize chromaticities that are only available at higher luminance values. Therefore the 'B' gamut would be limited to the intersection of the achievable 'B' gamut and the 'A' gamut.

There is a desire in the industry not to utilize colors outside the Rec2020 gamut. This is easily achieved by representing the source images in RGB with Rec2020 primaries and disallowing negative values. Content color-graded this way will never produce values outside Rec2020. When the content is packaged for distribution, it is transformed into a DCI-compliant package represented by CIE 1931 XYZ tri-stimulus values. Although XYZ can represent colors outside Rec2020, so long as the source was constrained to Rec2020, excursions in XYZ will never exceed Rec2020.

The methods in this disclosure cover various means for implementing this. The first two methods are computationally efficient and could easily be implemented in a simple filed-programmable gate array (FPGA) circuit. The third method is more computationally intensive and would typically be implemented in a graphics processor unit (GPU).

Method 1—Gamut Scaling

In this method two functions are defined:

$$f_l(C) = \text{if}(C<0.5)C, \text{ else } 0.5$$

$$f_u(C) = \text{if}(C<0.5)0, \text{ else } C-0.5$$

$$C \in R_{2020}, G_{2020}, B_{2020}$$

For all incoming tri-stimulus pixel values (denoted $R_{2020}$), the 'A' and 'B' gamut signals are derived as follows:

$$\begin{bmatrix} R_A \\ G_A \\ B_A \end{bmatrix} = \begin{bmatrix} f_l(R_{2020}) \\ f_l(G_{2020}) \\ f_l(B_{2020}) \end{bmatrix}$$

and $$\begin{bmatrix} R_B \\ G_B \\ B_B \end{bmatrix} = \begin{bmatrix} f_u(R_{2020}) \\ f_u(G_{2020}) \\ f_u(B_{2020}) \end{bmatrix}$$

The signals representing the 'A' gamut ($R_A$, $G_A$, $B_A$) and the signals representing the 'B' gamut ($R_B$, $G_B$, $B_B$) then drive the 6P primaries according to the blend matrixes $[B_{AL}]$, $[B_{AS}]$, $[B_{BL}]$, and $[B_{BS}]$ described above.

In this method, for luminance values above 50%, all RGB values are moved towards white to fit within the available gamut volume.

Method 2—Gamut Clipping

In this method two functions are defined:

$$f_l(C) = \text{if}(\text{max}RGB > 0.5), C * \frac{0.5}{\text{Max}RGB}, \text{ else } C$$

$$f_u(C) = C - f_l(C)$$

$$C \in R_{2020}, G_{2020}, B_{2020}$$

For all incoming tri-stimulus pixel values (denoted $R_{2020}$), the full unclipped 'A' and 'B' gamut signals are derived as follows:

$$\begin{bmatrix} R_{Af} \\ G_{Af} \\ B_{Af} \end{bmatrix} = [C]_A \begin{bmatrix} f_l(R_{2020}) \\ f_l(G_{2020}) \\ f_l(B_{2020}) \end{bmatrix}$$

and $$\begin{bmatrix} R_{Bf} \\ G_{Bf} \\ B_{Bf} \end{bmatrix} = [C]_B \begin{bmatrix} f_u(R_{2020}) \\ f_u(G_{2020}) \\ f_u(B_{2020}) \end{bmatrix};$$

where $[C]_A$ and $[C]_B$ are derived as will be described hereinafter.

These are then clipped as follows:

$$\begin{bmatrix} R_A \\ G_A \\ B_A \end{bmatrix} = \begin{bmatrix} \max(R_{Af}, 0) \\ \max(G_{Af}, 0) \\ \max(B_{Af}, 0) \end{bmatrix}$$

$$\begin{bmatrix} R_B \\ G_B \\ B_B \end{bmatrix} = \begin{bmatrix} \max(R_{Bf}, 0) \\ \max(G_{Bf}, 0) \\ \max(B_{Bf}, 0) \end{bmatrix}$$

In this method, values within the achievable gamut volume are left untouched and values outside (with negative RGB values) are clipped to the edge of the gamut in the direction of the negative primary.

An alternative method instead clips towards white:

$$\min_A = \min(R_{Af}, G_{Af}, B_{Af});$$

if($\min_A < 0$) then $$\begin{bmatrix} R_A \\ G_A \\ B_A \end{bmatrix} = \begin{bmatrix} R_{Af} - \min_A \\ G_{Af} - \min_A \\ B_{Af} - \min_A \end{bmatrix}$$

$\min_B = \min(R_{Bf}, G_{Bf}, B_{Bf})$;

if($\min B < 0$) then $$\begin{bmatrix} R_B \\ G_B \\ B_B \end{bmatrix} = \begin{bmatrix} R_{Bf} - \min_B \\ G_{Bf} - \min_B \\ B_{Bf} - \min_B \end{bmatrix}$$

Again, the signals representing the 'A' gamut ($R_A$, $G_A$, $B_A$) and the signals representing the 'B' gamut ($R_B$, $G_B$, $B_B$) then drive the 6P primaries according to the blend matrices described above.

$[C]_A$ and $[C]_B$ used above to convert tri-stimulus values to full, unclipped A and B gamut values are derived as follows. As indicated above, two sets of three primaries of the virtual A and B gamuts $\{R_A, G_A, B_A\}$ and $\{R_B, G_B, B_B\}$ are related to the long and short primaries of the display $\{R_L, G_L, B_L\}$ and $\{R_S, G_S, B_S\}$ according to the following blend matrices:

$$\begin{bmatrix} R_L \\ G_L \\ B_L \end{bmatrix} = [B_{AL}] \begin{bmatrix} R_A \\ G_A \\ B_A \end{bmatrix} + [B_{BL}] \begin{bmatrix} R_B \\ G_B \\ B_B \end{bmatrix} \quad [1]$$

and $$\begin{bmatrix} R_S \\ G_S \\ B_S \end{bmatrix} = [B_{AS}] \begin{bmatrix} R_A \\ G_A \\ B_A \end{bmatrix} + [B_{BS}] \begin{bmatrix} R_B \\ G_B \\ B_B \end{bmatrix} \quad [2]$$

Knowing the Normalized Primary Matrixes for $\{R_L, G_L, B_L\}$ and $\{R_S, G_S, B_S\}$, the XYZ value for arbitrary points in $\{R_L, G_L, B_L\}$ and $\{R_S, G_S, B_S\}$ is:

$$\begin{bmatrix} X \\ Y \\ Z \end{bmatrix} = [NPM]_{LLL} \begin{bmatrix} R_L \\ G_L \\ B_L \end{bmatrix} + [NPM]_{SSS} \begin{bmatrix} R_S \\ G_S \\ B_S \end{bmatrix}$$

Substituting [1], [2]:

$$\begin{bmatrix} X \\ Y \\ Z \end{bmatrix} = [NPM]_{LLL} \left\{ [B_{AL}] \begin{bmatrix} R_A \\ G_A \\ B_A \end{bmatrix} + [B_{BL}] \begin{bmatrix} R_B \\ G_B \\ B_B \end{bmatrix} \right\} + [NPM]_{SSS} \left\{ [B_{AS}] \begin{bmatrix} R_A \\ G_A \\ B_A \end{bmatrix} + [B_{BS}] \begin{bmatrix} R_B \\ G_B \\ B_B \end{bmatrix} \right\}$$

$$\begin{bmatrix} X \\ Y \\ Z \end{bmatrix} = [NPM]_{LLL}[B_{AL}] \begin{bmatrix} R_A \\ G_A \\ B_A \end{bmatrix} + [NPM]_{SSS}[B_{AS}] \begin{bmatrix} R_A \\ G_A \\ B_A \end{bmatrix} + [NPM]_{SSS}[B_{BS}] \begin{bmatrix} R_B \\ G_B \\ B_B \end{bmatrix} + [NPM]_{LLL}[B_{BL}] \begin{bmatrix} R_B \\ G_B \\ B_B \end{bmatrix}$$

$$\begin{bmatrix} X \\ Y \\ Z \end{bmatrix} = \{[NPM]_{LLL}[B_{AL}] + [NPM]_{SSS}[B_{AS}]\} \begin{bmatrix} R_A \\ G_A \\ B_A \end{bmatrix} + \{[NPM]_{SSS}[B_{BS}] + [NPM]_{LLL}[B_{BL}]\} \begin{bmatrix} R_B \\ G_B \\ B_B \end{bmatrix}$$

Putting in terms of primary matrices (Note $[PM]_A$ and $[PM]_B$ are not normalized primary matrices. Although the middle row of $[NPM]_{LLL}$ and $[NPM]_{SSS}$ each sum to 1, $[PM]_{A,B}$ take arbitrary blends of each column so the resulting middle row no longer sums to 1):

$$\begin{bmatrix} X \\ Y \\ Z \end{bmatrix} = [PM]_A \begin{bmatrix} R_A \\ G_A \\ B_A \end{bmatrix} + [PM]_B \begin{bmatrix} R_B \\ G_B \\ B_B \end{bmatrix}$$

where:

$[PM]_A = [NPM]_{LLL}[B_{AL}] + [NPM]_{SSS}[B_{AS}]$

Similarly:

$[PM]_B = [NPM]_{SSS}[B_{BS}] + [NPM]_{LLL}[B_{BL}]$

Given the normalized primary matrix for Rec2020

$[NPM]_{2020}$, then:

$[C]_A = [PM]_A^{-1}[NPM]_{2020}$, and $[C]_B = [PM]_B^{-1}[NPM]_{2020}$.

Method 3—Gamut Volume Modelling

In this method, the gamut volume achievable by utilizing the 'A' gamut for low luminance values and the 'B' gamut for higher luminance values, is modeled such that tri-stimulus values can be tested to determine whether they fall within the achievable gamut volume or not.

In one method, tri-stimulus values within the achievable gamut volume are unmodified. For values outside the gamut volume, the ratio of RGB values is preserved but the values are scaled to reduce luminance to fit within the available gamut volume.

In an alternative method, again the values within the achievable gamut volume are unmodified. For values outside the gamut volume, the luminance is preserved, but chromaticity is moved towards the mastering white point (e.g. D6500) to fit within the gamut volume.

In another method, tri-stimulus values within some threshold of the surface of the gamut volume would be dropped in luminance or moved towards the white point to achieve a "soft clip" to the surface of the gamut volume. This may reduce artifacts in cases where high luminance saturated colors are utilized heavily.

Flowcharts Summarizing Example Methods

Figure 5:
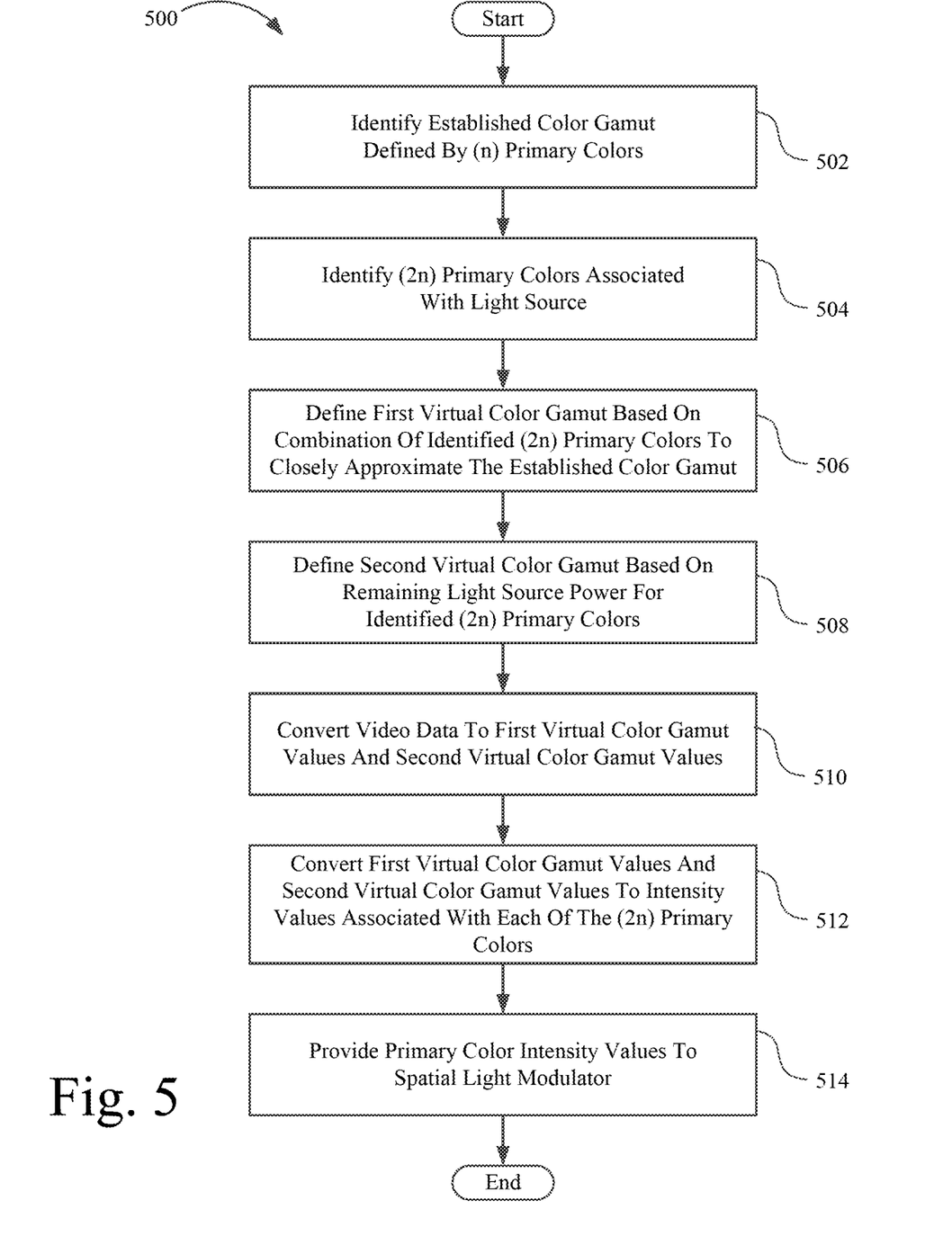
FIG. 5 is a flow chart summarizing an example method of displaying 2D images on a 3D display.

FIG. 5 is a flow chart summarizing an example method 500 of displaying 2D images on a 3D display. In a first step 502, an established color gamut defined by a number (e.g., 3) primary colors is identified. Then, in a second step 504 a different number (e.g., 6) of primary display colors associated with a light source are identified. Next, in a third step 506, a first virtual gamut is defined based on a combination of the identified primary display colors to closely approximate the identified established gamut. In a fourth step 508, a second virtual gamut is defined based on the residual light source power for the primary display colors. Then, in a fifth step 510, video data is converted to intensity values of the first and second virtual gamuts. Next, in a sixth step 512, the intensity values of the first and second virtual gamuts are converted to intensity values associated with the primary display colors. Then, in a seventh step 514, the intensity values associated with the primary display colors are provided to one or more spatial light modulators.

Figure 6A:
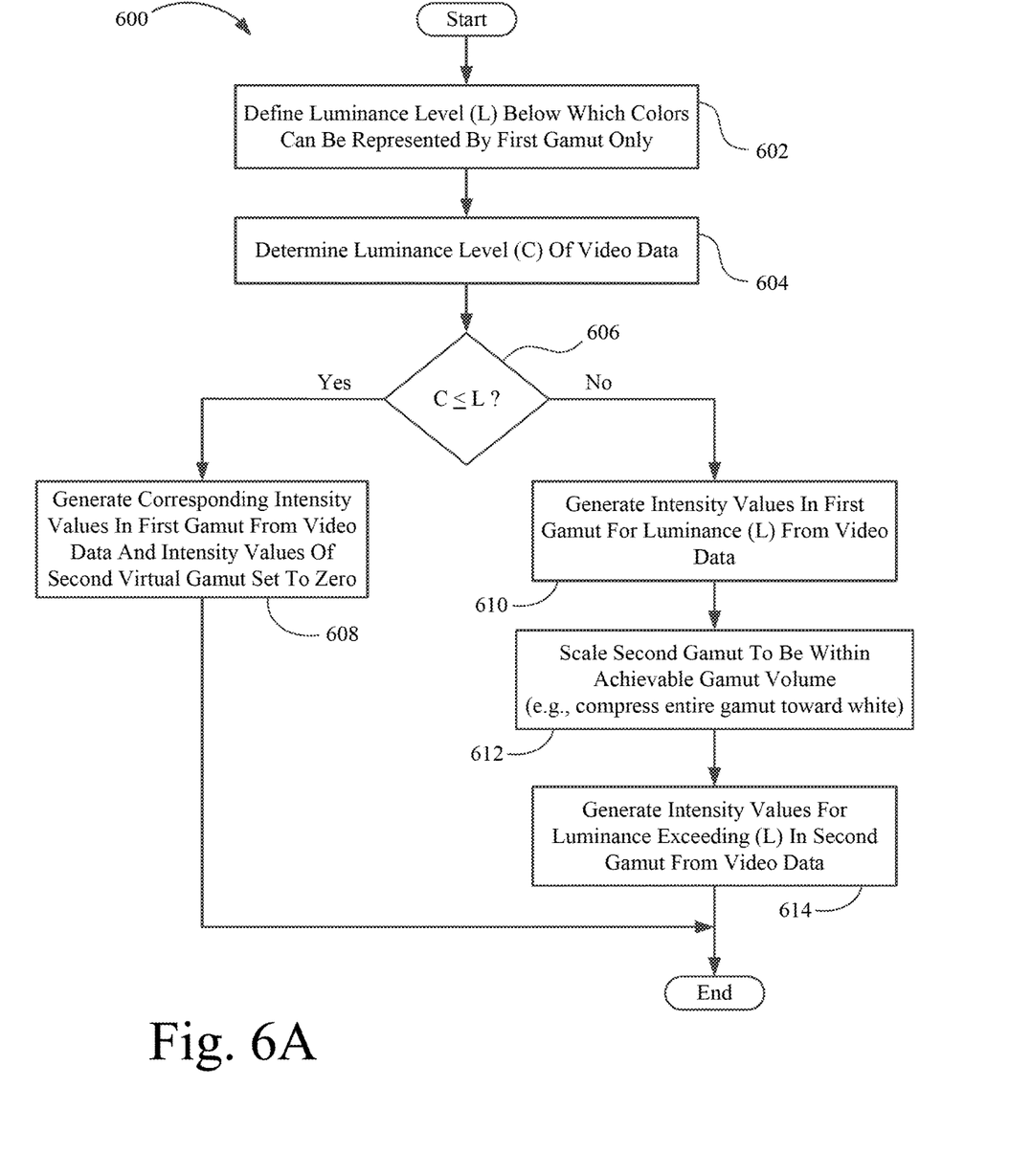
FIG. 6A is a flow chart summarizing an example method of performing a step of converting video data to first and second virtual color gamut values.

FIG. 6A is a flow chart summarizing an example method 600 of performing a step of converting video data to intensity values associated with the first and second virtual color gamuts. In a first step 602, a luminance level (L) at or below which colors can be represented by the first virtual color gamut alone is defined. Then, in a second step 604, the luminance level of video data is determined. Next, in a third step 606, it is determined whether the luminance level of the video data is at or below the defined luminance level (L). If it is determined that the luminance level of the video data is at or below the defined luminance level (L), then, in a fourth step 608, intensity values associated with the first virtual gamut are generated from the video data, and the intensity values associated with the second virtual gamut are set to zero.

If, in third step 606 it is determined that the luminance level of the video data is above the defined luminance level (L), then, in a fifth step 610, intensity values associated with the first virtual gamut are generated corresponding to the luminance level (L). Next, in a sixth step 612, the second gamut is scaled to be within an achievable gamut volume of the light source. Then, in a seventh step 614, intensity levels associated with the second virtual gamut are generated corresponding to an amount that the luminance level of the video data exceeds the defined luminance level (L).

Figure 6B:
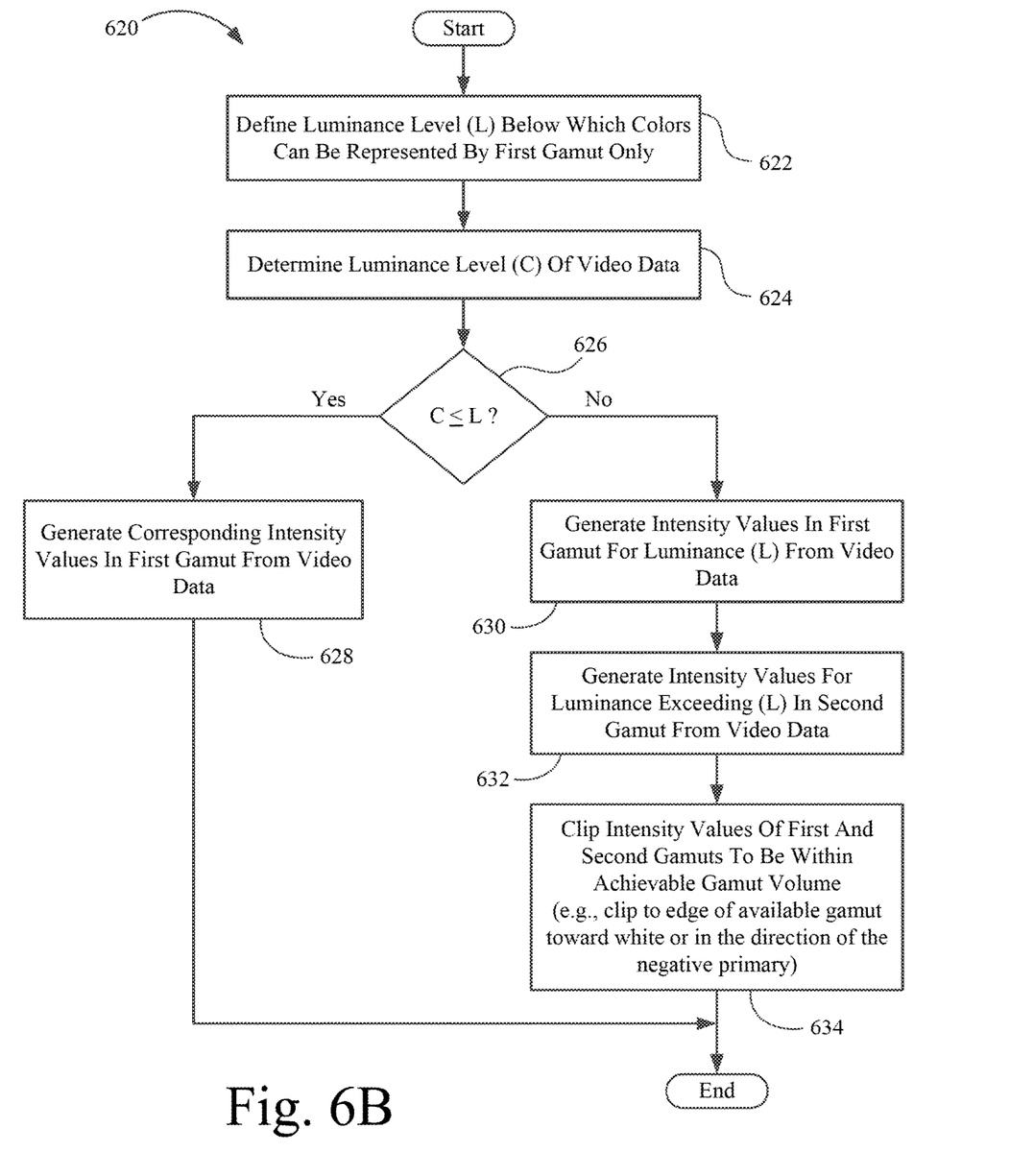
FIG. 6B is a flow chart summarizing another example method of performing a step of converting video data to first and second virtual color gamut values.

FIG. 6B is a flow chart summarizing another example method 620 of performing a step of converting video data to intensity values associated with the first and second virtual color gamuts. In a first step 622, a luminance level (L) at or below which colors can be represented solely by the first virtual color gamut is defined. Then, in a second step 624, the luminance level of video data is determined. Next, in a third step 626, it is determined whether the luminance level of the video data is at or below the defined luminance level (L). If it is determined that the luminance level of the video data is at or below the defined luminance level (L), then, in a fourth step 628, intensity values associated with the first virtual color gamut are generated from the video data, and the intensity values associated with the second virtual color gamut are set to zero.

If, in third step 626 it is determined that the luminance level of the video data is above the defined luminance level (L), then, in a fifth step 630, intensity values associated with the first virtual gamut are generated corresponding to the luminance level (L). Next, in a sixth step 632, intensity levels associated with the second virtual gamut are generated corresponding to an amount that the luminance level of the video data exceeds the defined luminance level (L). Then, in a seventh step 634, the intensity values associated with the first and second virtual gamuts are clipped to be within the achievable gamut volume.

Figure 6C:
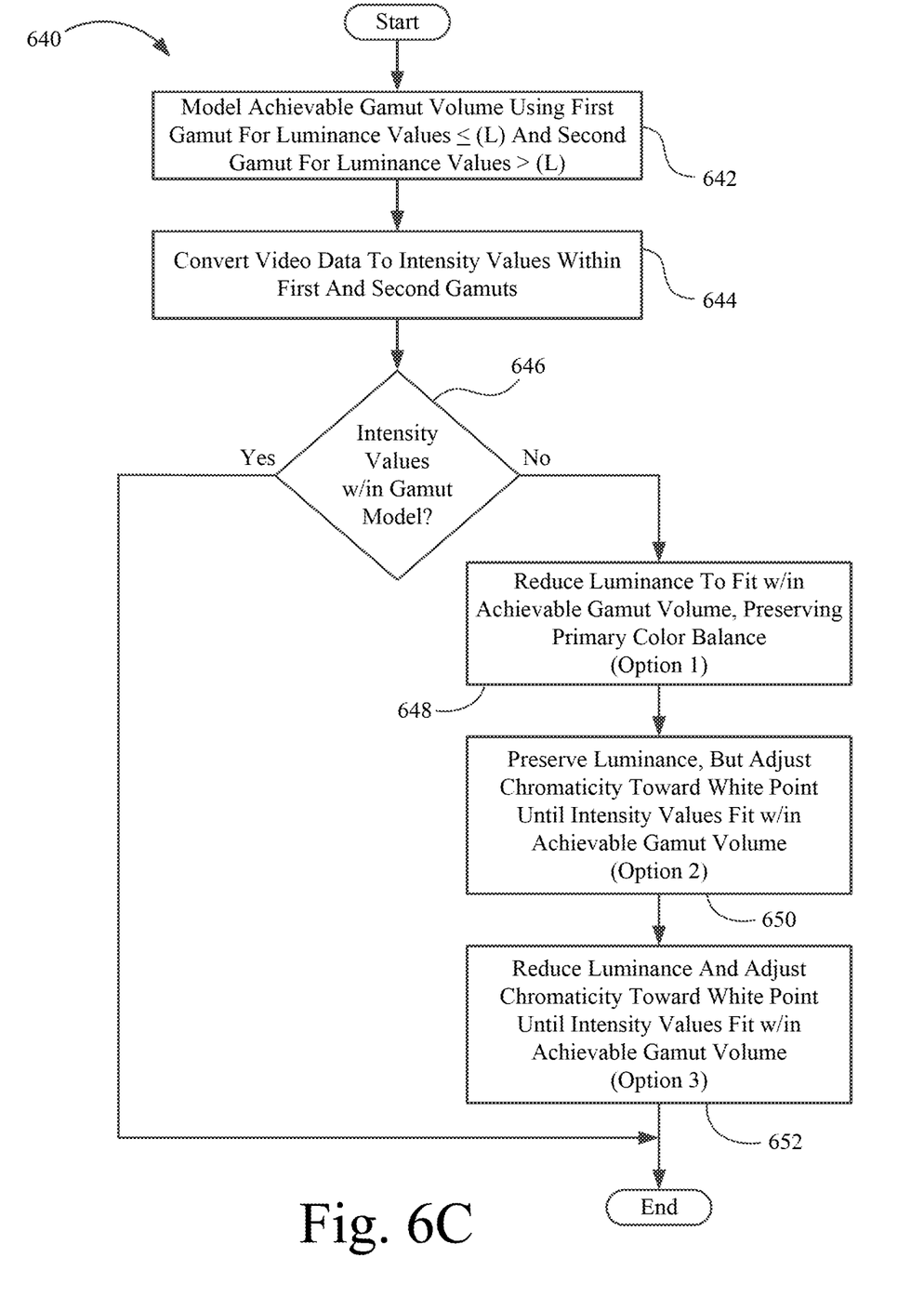
FIG. 6C is a flow chart summarizing yet another example method of performing a step of converting video data to first and second virtual color gamut values.

FIG. 6C is a flow chart summarizing yet another example method 640 of performing a step of converting video data to first and second virtual color gamut values. In a first step 642, an achievable gamut volume of the light source is modeled using the first virtual gamut for luminance values at or below a predetermined luminance level (L). Then, in a second step 644, video data is converted to intensity values associated with the first and second virtual color gamuts. Next, in a third step 646, it is determined whether the intensity values associated with the first and second virtual color gamuts fit within the modeled gamut volume. It the intensity values associated with the first and second virtual color gamuts do fit within the modeled gamut volume, method 640 ends. Otherwise, the intensity values associated with the first and second virtual color gamuts are modified according to one of the following optional steps. In an optional fourth step 648, the luminance of the intensity values associated with the first and second virtual color gamuts is reduced, while preserving the primary color balance of the data, until the intensity values fit within the modeled gamut volume. In an optional fifth step 650, the luminance of the intensity values associated with the first and second virtual color gamuts is preserved, but chromaticity is adjusted towards a white point until the intensity values fit within the modeled gamut volume. In an optional sixth step 652, the luminance of the intensity values associated with the first and second virtual color gamuts is reduced and the chromaticity is adjusted toward the white point until the intensity values associated with the first and second virtual color gamuts fit within the modeled gamut volume, thus achieving a "soft clip" to the surface of the gamut volume.

The description of particular embodiments of the present invention is now complete. Many of the described features may be substituted, altered or omitted without departing from the scope of the invention. For example, the example embodiment is a shown as a projector. However, the inventive methods and components can be employed in a color grading desk. As another option, the methods and components of this disclosure can be embodied in an intermediate device interposed between a color grading desk and a projector or other display. This and other deviations from the particular embodiments shown will be apparent to those skilled in the art, particularly in view of the foregoing disclosure.

We claim:

1. A method for displaying image data, said method comprising:
   identifying an established color gamut defined by a predefined number of primary colors;
   identifying a number of primary display colors associated with a light source, said number of primary display colors associated with said light source exceeding said number of primary colors defining said established color gamut;
   defining a first virtual color gamut based on a combination of said primary display colors associated with said light source to approximate said established color gamut;
   receiving video data including intensity values corresponding to a number of colors fewer than said number of primary display colors associated with said light source;
   generating intensity values associated with said first virtual color gamut based on said video data;
   defining a second virtual color gamut based on residual power of said light source considering said first virtual color gamut;
   generating intensity values associated with said second virtual color gamut based on said video data;
   generating intensity values associated with said primary display colors of said light source based on said intensity values associated with said first virtual color gamut and said intensity values associated with said second virtual color gamut; and providing said intensity values associated with said primary display colors to a spatial light modulator.

2. The method of claim 1, wherein said number of primary display colors is twice as large as said number of colors corresponding to said intensity values of said video data.

3. The method of claim 2, wherein said number of primary display colors is 6 and said video intensity values corresponding to no more than 3 colors.

4. The method of claim 1, wherein at least one of said steps of generating intensity values associated with said first virtual color gamut based on said video data and generating intensity values associated with said second virtual color gamut based on said video data includes:

determining an intensity level indicated by said video data; and generating said intensity values associated with at least one of said first virtual color gamut and said second virtual color gamut based on said intensity level indicated by said video data.

5. The method of claim 4, wherein generating said intensity values associated with at least one of said first virtual color gamut and said second virtual color gamut based on said intensity level indicated by said video data includes:

determining whether said intensity level indicated by said video data exceeds a predetermined intensity level; and if said intensity level indicated by said video data does not exceed said predetermined intensity level, then generating said intensity values associated with said first virtual gamut based on said video data and setting said intensity values associated with said second virtual gamut to zero.

6. The method of claim 5, wherein:

said step of determining an intensity level indicated by said video data includes determining a separate intensity level for each color of said number of colors represented by said video data; and said step of determining whether said intensity level indicated by said video data exceeds a predetermined intensity level includes determining whether each of said separate intensity levels for each color exceeds a predetermined intensity level.

7. The method of claim 5, wherein, if said intensity level indicated by said video data does exceed said predetermined intensity level, then:

generating an intensity value associated with said first virtual gamut based on said predetermined intensity level; and generating an intensity value associated with said second virtual gamut based on an amount said intensity level indicated by said video data exceeds said predetermined intensity level.

8. The method of claim 1, wherein the second virtual gamut is scaled to fit intensity values of said video data within an achievable gamut volume of the light source.

9. The method of claim 8, wherein the scaling comprises compressing the second virtual gamut toward white.

10. The method of claim 1, further comprising clipping intensity values of at least one of said first virtual gamut and said second virtual gamut to fit within an achievable gamut volume of the light source.

11. The method of claim 10, wherein intensity values of at least one of said first virtual gamut and said second virtual gamut are clipped toward white.

12. The method of claim 10, wherein intensity values of at least one of said first virtual gamut and said second virtual gamut are clipped to the edge of said achievable gamut volume.

13. The method of claim 1, further comprising:

modeling an achievable gamut volume of said first virtual gamut and said second virtual gamut;

determining whether said generated intensity values of said first virtual gamut and said second virtual gamut fit within said modeled gamut volume;

leaving said intensity values of said first virtual gamut and said second virtual gamut that fit within said modeled gamut volume unmodified; and modifying intensity values of said first virtual gamut and said second virtual gamut that do not fit within said modeled gamut volume.

14. A display including:

a light source having a number of primary display colors, said number of primary display colors exceeding a number of primary colors defining an established color gamut;

a spatial light modulator illuminated by said light source;

a controller operative to receive video data including intensity values associated with a number of colors less than said number of primary display colors, generate intensity values associated with a first virtual color gamut based on said video data, said first virtual color gamut defined by a combination of said primary display colors to match said established color gamut, generate intensity values for each of said primary display colors based on said intensity values associated with said first virtual gamut, and provide said intensity values for each of said primary display colors to said spatial light modulator;

wherein said controller is further operative to:

generate intensity values associated with a second virtual color gamut based on said video data, said second virtual color gamut defined based on residual power of said light source considering said first virtual color gamut;

generate intensity values associated with said second virtual color gamut based on said video data; and use said intensity values associated with said second virtual color gamut to generate said intensity values associated with said primary display colors.

* * * * *